United States Patent [19]

Ezzell et al.

[11] Patent Number: 4,940,525
[45] Date of Patent: Jul. 10, 1990

[54] LOW EQUIVALENT WEIGHT SULFONIC FLUOROPOLYMERS

[75] Inventors: Bobby R. Ezzell, Lake Jackson; William P. Carl, Angleton, both of Tex.

[73] Assignee: The Dow Chemical Company, Midland, Mich.

[21] Appl. No.: 47,814

[22] Filed: May 8, 1987

[51] Int. Cl.$^5$ .............................................. C25B 13/08
[52] U.S. Cl. .................................. 204/252; 204/296; 521/25; 521/27; 428/422; 428/424.2; 428/515; 428/516
[58] Field of Search ................. 204/252, 296; 428/422, 428/424.2, 515, 516; 521/25, 27

[56] References Cited

U.S. PATENT DOCUMENTS

| | | | |
|---|---|---|---|
| 3,282,875 | 11/1966 | Connolly et al. | 260/29.6 |
| 3,909,378 | 9/1975 | Walmsley | 204/98 |
| 4,025,405 | 5/1977 | Dotson et al. | 204/98 |
| 4,065,366 | 12/1977 | Oda et al. | 204/98 |
| 4,116,888 | 9/1978 | Ukihashi et al. | 521/31 |
| 4,123,336 | 10/1978 | Seko et al. | 204/98 |
| 4,126,588 | 11/1978 | Ukihashi et al. | 521/31 |
| 4,151,052 | 4/1979 | Goto et al. | 204/95 |
| 4,176,215 | 11/1979 | Molnar et al. | 521/27 |
| 4,178,218 | 12/1979 | Seko | 204/98 |
| 4,192,725 | 3/1980 | Dotson et al. | 204/98 |
| 4,209,635 | 6/1980 | Munekata et al. | 560/183 |
| 4,212,713 | 7/1980 | Suhara et al. | 204/98 |
| 4,251,333 | 2/1981 | Suhara et al. | 204/98 |
| 4,270,996 | 6/1981 | Suhara et al. | 204/98 |
| 4,329,434 | 5/1982 | Kimoto et al. | 521/27 |
| 4,329,435 | 5/1982 | Kimoto et al. | 521/38 |
| 4,330,654 | 5/1982 | Ezzell et al. | 526/243 |
| 4,337,137 | 6/1982 | Ezzell | 204/252 |
| 4,337,211 | 6/1982 | Ezzell et al. | 260/456 F |
| 4,340,680 | 7/1982 | Asawa et al. | 521/27 |
| 4,357,218 | 11/1982 | Seko | 204/98 |
| 4,358,412 | 11/1982 | Ezzell et al. | 260/968 |
| 4,358,545 | 11/1982 | Ezzell et al. | 521/27 |
| 4,417,969 | 11/1983 | Ezzell et al. | 204/252 |
| 4,462,877 | 7/1984 | Ezzell | 204/98 |
| 4,470,889 | 9/1984 | Ezzell et al. | 204/98 |
| 4,478,695 | 10/1984 | Ezzell et al. | 204/98 |
| 4,515,989 | 5/1985 | Ezzell et al. | 568/674 |
| 4,554,112 | 11/1985 | Ezzell et al. | 260/543 F |
| 4,578,512 | 3/1986 | Ezzell et al. | 562/586 |
| 4,687,821 | 8/1987 | Ezzell et al. | 526/247 |

FOREIGN PATENT DOCUMENTS 0027009 4/1981 European Pat. Off. ............. 214/18

OTHER PUBLICATIONS

W. G. F. Grot et al., "Perfluorinated Ion Exchange Membranes", presented to the 141st National Meeting of the Electrochemical Society, Houston, Texas, May 1972.

"The Physical and Mechanical Properties of a New Perfluorosulfonic Acid Ionomer for Use as a Separator/Membrane in Proton Exchange Processes", G. A. Eisman, May 9, 1986.

Primary Examiner—John F. Niebling
Assistant Examiner—Kathryn Gorgos

[57] ABSTRACT

The invention is a sulfonic fluoropolymer having a fluoropolymer backbone having pendant groups attached thereto and represented by the general formula:

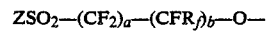

$$ZSO_2-(CF_2)_a-(CFR_f)_b-O-$$

where: Z is a halogen, an alkali metal, hydrogen, or OR; R is a branched or linear alkyl radical having from 1 to about 10 carbon atoms or an aryl radical; a is 0–2; b is 0–2; provided a+b is not equal to 0; $R_f$ is selected from the group consisting of —F, —Cl, perfluoroalkyl radicals having from 1 to about 10 carbon atoms and fluorochloroalkyl radicals having from 1 to about 10 carbon atoms, wherein the sulfonic fluoropolymer has an equivalent weight of less than about 725, and a hydration product of less than about 22,000.

The invention also includes sulfonic fluoropolymers having a fluoropolymer backbone and having pendant groups attached thereto represented by the general formula:

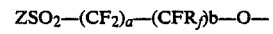

$$ZSO_2-(CF_2)_a-(CFR_f)b-O-$$

where Z, a, b and $R_f$ are defined above, provided however, that a+b is equal to 1 or 2, and wherein the sulfonic fluoropolymer has an equivalent weight less than about 725.

11 Claims, No Drawings

LOW EQUIVALENT WEIGHT SULFONIC FLUOROPOLYMERS

The present invention is a new family of sulfonic fluoropolymers that have physical and chemical properties that are quite unexpected in view of the teachings of the prior art.

BACKGROUND OF THE INVENTION

Sulfonic fluoropolymers containing pendant groups terminating with sulfonic groups have been described in the prior art including, for example, U.S. Pat. No. 4,478,695, issued Oct. 23, 1984: U.S. Pat. No. 4,417,969, issued Nov. 29, 1983; and U.S. Pat. No. 4,358,545, issued Nov. 9, 1982. Such sulfonic fluoropolymers have been found to be useful in hot, aqueous media, such as chlor-alkali cells, when the sulfonic fluoropolymer's equivalent weight is above about 800 and its hydration product is less than about 22,000. These sulfonic fluoropolymers were also taught as being useful for a variety of other membrane separator applications and to be useful as acid catalysts.

When sulfonic fluoropolymers are used as membranes, it is desirable for them to be in the form of films. They should have physical integrity commensurate with the physical demands of the device in which they will be used. In electrochemical devices such as electrochemical cells, physical demands on the membrane vary, depending upon the type of cell and the configuration of the cell. For example, in some cells, electrodes (anodes and cathodes) are spaced substantially apart from each other and have the membrane placed between the two electrodes. In such cell configurations, the membrane functions, more or less, as a free-standing film. Such free-standing membrane films are commonly reinforced to increase their strength. Reinforcement materials which are commonly used include a variety of materials such as woven scrims, and randomly-dispersed fibers. However, even when supported, there are still certain minimum levels of physical integrity which the membrane is required to have. Otherwise, it breaks apart and looses its utility.

There are other types of electrochemical cells which are constructed to have electrodes or current collectors in intermittent or continuous contact with a membrane positioned between an anode and a cathode. Such cells are generally referred to as zero gap or solid polymer electrolyte cells. In such cells, the electrodes provide physical support such that membrane films with less physical integrity can be used, whether reinforced or not.

Physical integrity of ionic fluoropolymers are determined, to a large degree, by the amount of water or solvent the fluoropolymers contain. Thus, a sulfonic fluoropolymer that swells excessively because it absorbs substantial amounts of water or solvent, tends to become gel-like and lose much of its physical integrity, relative to an unswollen sulfonic fluoropolymer. The level of swelling (the level of water absorption) is largely determined by the temperature and the environment. For example, a given sulfonic fluoropolymer may be swollen to different levels by water under different conditions. Pure water at a given temperature swells the sulfonic fluoropolymer more than aqueous, salt-containing electrolytes, which, in turn, swell the sulfonic fluoropolymer more than humid gases. However, it is known that increasing the temperature results in increased swelling (water absorption) in each environment listed above. Thus, a single definition of suitable physical characteristics of a sulfonic fluoropolymer to define its usefulness is difficult, because utility depends upon the use to which the sulfonic fluoropolymer will be put.

The prior art defined sulfonic fluoropolymers as being useful primarily in terms of the water absorption of the sulfonic fluoropolymers in an environment of hot aqueous electrolytes, such as the type of environment found in electrolytic cells, for example chlor-alkali cells. From such considerations were derived the limitations of 800–1500 equivalent weights and hydration products of less than 22,000. In those prior art patents, a sulfonic fluoropolymer having a 798 equivalent weight and having a hydration product of 29,400 was not considered useful because of excessive hydration. (See U.S. Pat. No. 4,358,545, Example 1). However, it has been discovered that such equivalent weight and hydration product limitations are not valid for certain sulfonic fluoropolymers that are described herein.

Another matter of concern in defining usefulness of sulfonic fluoropolymers as membranes, is the chemical requirements in a given application. Thus, a film of a sulfonic fluoropolymer used as a separator in a chlor-alkali cell has two critical criteria that it should preferably meet: electrical conductivity and the ability to reject anions. The sulfonic fluoropolymer chosen for use in such conditions is usually based on a trade-off between the electrical conductivity of the sulfonic fluoropolymer, which is effected by both equivalent weight and water absorption, and the sulfonic fluoropolymer's ability to reject hydroxide ions, which is largely determined by the level of hydration, i.e., the degree of hydration per functional group in the sulfonic fluoropolymer. Under these circumstances, where one desires to minimize the passage of hydroxide ions, one usually chooses a sulfonic fluoropolymer having a higher equivalent weight than if one based his decision strictly upon electrical conductivity of the fluoropolymer, alone. Thus, the physical properties of the fluoropolymer, as determined by swelling, is not the deciding factor in choosing the fluoropolymer for this particular use. Therefore, it would be very advantageous to have fluoropolymers which have high ionic conductivity while yet maintaining physical integrity as a viable selective ion transport medium.

Other applications, such as fuel cells and proton pumps, present entirely different chemical and physical requirements for the membrane. The different conditions result in different levels of swelling of the sulfonic fluoropolymer, than encountered in the hot electrolytes of chlor-alkali cells. In fuel cell or proton pump applications, there is little, if any, requirement for rejection of negative ions. The primary requirement is transport of protons at the lowest possible electrical resistance. Thus, the sulfonic fluoropolymer having the lowest equivalent weight within physical constraints resulting from swelling characteristics is desired.

The prior art U.S. Pat. No. 4,358,545) used the measured water swelling of a sulfonic fluoropolymer in its acid form (-H+) to calculate a hydration product as a means of combining two important sulfonic fluoropolymer properties: hydration as measured in moles of water per functional group and equivalent weight. This criteria continues to appear sufficient to characterize sulfonic fluoropolymers having superior performance characteristics. In addition, this prior art found a surprising difference between hydration characteristics of sulfonic fluoropolymers having short pendant chains as opposed to sulfonic fluoropolymers having longer pendant chains (U.S. Pat. No. 3,282,875).

SUMMARY OF THE INVENTION

The invention is a sulfonic fluoropolymer having a fluoropolymer backbone having pendant groups attached thereto and represented by the general formula:

$$ZSO_2\text{-}(CF_2)_a\text{-}(CFR_f)_b\text{-}O\text{-}$$

where: Z is a halogen, an alkali metal, hydrogen, or OR: R is a branched or linear alkyl radical having from 1 to about 10 carbon atoms or an aryl radical; a is 0–2; b is 0–2; provided a+b is not equal to 0: $R_f$ is selected from the group consisting of —F,—Cl, perfluoroalkyl radicals having from 1 to about 10 carbon atoms and fluorochloroalkyl radicals having from 1 to about 10 carbon atoms, wherein the sulfonic fluoropolymer has an equivalent weight of less than about 800, and a hydration product of less than about 29,000, when Z is hydrogen.

The invention also includes sulfonic fluoropolymers having a fluoropolymer backbone and having pendant groups attached thereto represented by the general formula:

$$ZSO_2\text{-}(CF_2)_a\text{-}(CFR_f)_b\text{-}O\text{-}$$

where Z, a, b and Rf are defined above, provided however, that a+b is equal to 1 or 2, wherein the sulfonic fluoropolymer has an equivalent weight less than about 750.

DETAILED DESCRIPTION OF THE INVENTION

Prior to the present invention, it was thought that sulfonic fluoropolymers having attached pendant groups which terminate with a sulfonic group had insufficient strength, when formed into films, and exposed to conditions that swelled the sulfonic fluoropolymers, to maintain their physical integrity. It was thought that such sulfonic fluoropolymers, in the presence of water or another polar media, would merely be a gel and would have substantially no film properties at all. Thus, it was believed that such sulfonic fluoropolymers were of substantially no value, even if they were cast into films and supported. However, it has been discovered that sulfonic fluoropolymers can be prepared (using carefully controlled techniques) that have equivalent weights below about 800 and which are perfectly suitable for many uses, including uses where the sulfonic fluoropolymer must have film properties (supported or unsupported). This discovery is particularly significant because it provides sulfonic fluoropolymers which have substantially more functional groups per unit mass of sulfonic fluoropolymer, than do sulfonic fluoropolymers of the prior art. This increase in the concentration of functional groups, while maintaining the physical integrity of the sulfonic fluoropolymer films, provides a sulfonic fluoropolymer that has the ability to transport more ions, and thus, the ability to operate much more efficiently than corresponding sulfonic fluoropolymers of the prior art that have higher equivalent weights.

This new family of polymers presents a range of operation extended up to the characteristics of the previous art. A new, novel region of polymer compositions resulting in a new, broader range of hydration properties producing usable polymers, even in an equivalent weight range and a hydration product range previously believed to be deficient.

Although not wanting to be bound to any particular theory, it is thought that the sulfonic fluoropolymers of the present invention have surprisingly good film properties because (a). their molecular weight is more uniform (molecule to molecule), than the molecular weight of the sulfonic fluoropolymers of the prior art and, (b). because their equivalent weight (molecule to molecule) is much more uniform than the equivalent weights of the sulfonic fluoropolymers of the prior art.

It is thought that molecular weight, as well as molecular weight distribution of sulfonic fluoropolymers, play a role in the degree to which the sulfonic fluoropolymer will swell, when exposed to water or other polar media. It is thought that low molecular weight sulfonic fluoropolymer fractions plasticize the sulfonic fluoropolymer and result in increased swelling. Lower equivalent weight sulfonic fluoropolymer fractions are also thought to distort the swelling of the sulfonic fluoropolymer, measured for a given equivalent weight sulfonic fluoropolymer, because of nonlinear swelling that occurs at sufficiently low equivalent weight. The exact molecular weight and molecular weight distribution of sulfonic fluoropolymers, as well as equivalent weight distribution, are difficult to measure. However, the resultant effects of these factors, and possibly other factors yet to be identified, can be seen by the simple measurement of water swelling of the sulfonic fluoropolymer in its acid form using, what has come to be accepted as a standard method, a method described by W. G. F. Grot et al., *Perfluorinated Ion Exchange Membranes.* 141st National Meeting of The Electrochemical Society, Houston, Texas, May 1972. It would, of course, be possible to develop similar swelling relationships with ionic forms of the fluoropolymer other than the acid (hydrogen) form, but for sake of convention, the acid form is used throughout the present specification.

The present invention includes two embodiments. The first embodiment is a sulfonic fluoropolymer having a fluoropolymer backbone having pendant groups attached thereto and represented by the general formula:

$$ZSO_2\text{-}(CF_2)_a\text{-}(CFR_f)_b\text{-}O\text{-}$$

where: Z is a halogen, an alkali metal, hydrogen, or OR; R is a branched or linear alkyl radical having from 1 to about 10 carbon atoms or an aryl radical: a is 0–2; b is 0–2; provided a+b is not equal to 0; Rf is selected from the group consisting of —F,—Cl, perfluoroalkyl radicals having from 1 to about 10 carbon atoms and fluorochloroalkyl radicals having from 1 to about 10 carbon atoms, wherein the sulfonic fluoropolymer has an equivalent weight of less than about 800, and a hydration product (where Z is hydrogen) of less than about 29,000.

It has been found that sulfonic fluoropolymers having short pendant chains as described in the prior art can have hydration products less than 22,000 at equivalent weight values well below 800, while still demonstrating film properties useful in a variety of processes. Sulfonic fluoropolymers meeting this criteria have been prepared at equivalent weights as low as 687, while having a hydration product of 19,700.

The first embodiment also includes useful sulfonic fluoropolymers having equivalent weights less than 800 and hydration products that are less than about 29,000. Preferably, the sulfonic fluoropolymers have hydration products less than about 26,000. More preferably, the sulfonic fluoropolymers have hydration products less than about 22,000. Even more preferably, the sulfonic fluoropolymers have hydration products less than about 15,000. Likewise, the sulfonic fluoropolymers of the first embodiment can have equivalent weights less than about 750. More preferably, the sulfonic fluoropolymers can have equivalent weights less than about 700. Even more preferably, the sulfonic fluoropolymers can have equivalent weights less than about 675. Most preferably, the sulfonic fluoropolymers can have equivalent weights less than about 650. These sulfonic fluoropolymers are particularly useful in applications where the environment does not consist of hot liquid electrolytes or when there are less severe physical requirements. Exemplary of these applications is where the environment is largely humid vapors such as in fuel cells or proton pumps. Sulfonic fluoropolymers having a hydration product up to as high as about 29,000 even in applications involving hot aqueous media when used as support layers in composite membranes, and particularly when reinforced, are useful.

It has been discovered that fluoropolymers can have good film properties at equivalent weights below about 750 and have hydration products less than about 26,000. In fact, they can have hydration products less than about 22,000, or even less than about 15,000. Some sulfonic fluoropolymers can have hydration products below about 22,000 and have equivalent weights below about 700. They can even have equivalent weights below about 675.

The second embodiment of the present invention invention is a sulfonic fluoropolymer having a fluoropolymer backbone and having pendant groups attached thereto represented by the general formula:

$$ZSO_2\text{-}(CF_2)_a\text{-}(CFR_f)_b\text{-}O\text{-}$$

where Z, a, b and $R_f$ are defined above, provided however, that a+b is equal to 1 or 2, and wherein the sulfonic fluoropolymer has an equivalent weight less than about 750. Sulfonic fluoropolymers within the scope of the second embodiment of the invention have only minimal film properties. However, such sulfonic fluoropolymers are still useful for a variety of purposes including, for example, coating ion selective electrodes. Also, such sulfonic fluoropolymers may be mixed with or coated onto support materials where the physical shape and integrity of the final product are controlled by the support material. In these cases the sulfonic fluoropolymer may be used as either a protective barrier, an ionic conducting material, or both, such as in the case of an electrode coating. Since the sulfonic fluoropolymer is not dependent upon itself for its physical stability, the necessity of the sulfonic fluoropolymer film being self-supporting is not needed. In such cases, the hydration product of the sulfonic fluoropolymer is not critical and may exceed 29,000. In fact, the hydration product of such sulfonic fluoropolymers can be quite high. They may be as high as, or higher, than about 100,000. The primary requirements for these types of sulfonic fluoropolymers are that they are not soluble in the environment where they are used nor are they soluble during the processing step to convert the sulfonic fluoropolymers to their ionic form, as described later in the specification. The equivalent weight of such polymers can be less than about 725 or even less than about 700. It is also quite possible that such sulfonic fluoropolymers can have equivalent weights less than about 675 or even less than 650. Some sulfonic fluoropolymers have been shown to have equivalent weights less than about 600 or even less than about 575.

Sulfonic fluoropolymers having equivalent weights less than about 800 and hydration products less than about 29,000 are useful as films in a variety of electrochemical applications whereas sulfonic fluoropolymers having equivalent weights less than about 750, but usually not less than about 500 are useful where ionic conductivity is the prime concern and physical requirements are minimal, but the requirement for insolubility as described above is necessary. It is believed that the combination of shorter pendant groups relative to the majority of the prior art and careful control to produce uniform sulfonic fluoropolymers allows the existence of such materials.

Sulfonic fluoropolymers having fluoropolymer backbones and pendant groups attached thereto and terminating in a sulfonyl group are suitable for use in the present invention. Examples of such sulfonic fluoropolymers are illustrated, for example, in: U.S. Pat. Nos. 4,578,512, Mar. 25, 1986; 4,554,112, Nov. 19, 1985; 4,515,989, May 7, 1985; 4,478,695, Oct. 23, 1984; 4,470,889, Sept. 11, 1984; 4,462,877, July 31, 1984; 4,417,969, Nov. 29, 1983; 4,358,545, Nov. 9, 1982; 4,358,412, Nov. 9, 1982; 4,337,211, June 29, 1982; 4,337,137, June 29, 1982; 4,330,654, May 18, 1982. Other short-chain polymers are shown in U.S. Pat. No. 4,329,434 and 4,329,435.

Particularly preferred sulfonic fluoropolymer materials for use in the present invention are copolymers of monomer I with monomer II (as defined below). Optionally, a third type of monomer may be copolymerized with I and II.

The first type of monomer is represented by the general formula:

$$CF_2\text{=}CZZ' \qquad (I)$$

where: Z and Z' are independently selected from the group consisting of —H, —Cl, —F, or —CF$_3$.

Upon polymerization with monomer II or with monomers I and II monomer (I) forms part of the backbone of the sulfonic fluoropolymer.

The second monomer consists of one or more monomers selected from compounds represented by the general formula:

$$ZSO_2\text{-}(CF_2)_a\text{-}(CFR_f)_b\text{-}O\text{-}CF\text{=}CF_2 \qquad (II)$$

where: Z is a halogen, an alkali metal, hydrogen, or OR; R is a branched or linear alkyl radical having from 1 to about 10 carbon atoms or an aryl radical; a is 0–2; b is 0–2; provided a+b is not equal to 0: $R_f$ is selected from the group consisting of F, Cl, perfluoroalkyl radicals having from 1 to about 10 carbon atoms and fluorochloroalkyl radicals having from 1 to about 10 carbon atoms.

Particularly preferred is when $R_f$ is F; and a+b is 2 or 3. Most particularly preferred is when $R_f$ is —F and a+b is 2 or 3.

This monomer (II) forms a pendant group having the formula:

$ZSO_2\text{-}(CF_2)_{a'}\text{-}(CFR_f)_{b'}\text{-}O\text{-}$.

The third, and optional, monomer suitable is one or more monomers selected from the compounds represented by the general formula:

$$Y\text{-}(CF_2)_{a'}\text{-}(CFR_f)_{b'}\text{-}CFR_f'\text{-}O\text{-}[CF(CF_2X)CF_2\text{-}O\text{-}]_n\text{-}CF\!=\!CF_2 \quad (III)$$

where: Y is —F, —Cl or —Br; a' and b' are independently 0-3: n is 0-6; $R_f$ and $Rf'$ are independently selected from the group consisting of —Br, —Cl, —F, perfluoroalkyl radicals having from about 1 to about 10 carbon atoms, and chloroperfluoroalkyl radicals having from 1 to about 10 carbon atoms: and X is —F, —Cl, —Br, or mixtures thereof when n>1.

This monomer (III) forms a pendant group having the following formula:

$$Y\text{-}(CF_2)_{a'}\text{-}(CFR_f)_{b'}\text{-}CFR_f'\text{-}O\text{-}[CF(CF_2X)CF_2\text{-}O\text{-}]_n\text{-}.$$

Particularly preferred are monomers (III) where n is 0, and Rf and $R_f'$ are each —F.

Sulfonic fluoropolymers of the present invention can be produced by a variety of polymerization processes. The process used should be ones that are known to result in high molecular weight sulfonic fluoropolymers. Care should be exercised to ensure good control of molecular weight distribution and equivalent weight distribution of the sulfonic fluoropolymer being produced. Exemplary of such a process is emulsion polymerization.

Emulsion polymerization is a polymerization reaction carried out with the reactants in emulsified form. It is usually performed at normal pressure and at a temperature of from about —20° to about +100° C. There are two basic types of emulsion polymerization, continuous and batch. In continuous emulsion polymerization, the polymerization reaches a steady state that ensures constant condition during the polymerization. The continuous process provides for the maintenance of conditions that lead, it is thought, to sulfonic fluoropolymers having consistent molecular weights and consistent equivalent weights. In any case, the sulfonic fluoropolymers made under such conditions have surprisingly good film properties.

Batch emulsion polymerization processes are, in many cases, less costly and more convenient, especially for smaller scale production of sulfonic fluoropolymers. However, care should be taken to avoid excessive monomer conversion which can result in drift in sulfonic fluoropolymer composition (nonuniform molecular and equivalent weights). Batch emulsion polymerization reactions are usually performed by loading all of the fluorosulfonyl monomer reactant into a reactor and then maintaining a supply of the second reactant under constant pressure of the comonomer. In the present case, the comonomer is tetrafluoroethylene (TFE). Conversion of the fluorosulfonyl monomer into the sulfonic fluoropolymer beyond a conversion level of about 50-60% and particularly beyond about 80-90%, can lead to higher equivalent weight sulfonic fluoropolymers being formed in the latter part of the reaction. If the comonomer pressure is allowed to trail too far downward during the reaction, sulfonic fluoropolymer fractions with lower molecular and lower equivalent weight can, and usually do, result. Naturally, the formation of lower equivalent weight sulfonic fluoropolymers is not desired, because, it is thought, that their presence leads to sulfonic fluoropolymers that have inferior film properties. Excessively long startup times for reaching constant temperature and pressure can also result in inconsistent molecular and equivalent weight sulfonic fluoropolymers. In general, it is thought to be best to ensure that as constant conditions as possible are maintained throughout the emulsion polymerization reaction.

After polymerization, conversion of the fluorosulfonyl to an ionic form requires alkaline hydrolysis. The hydrolysis may be done in a variety of ways, but usually involves the use of caustic soda or potash in water, or a mixture of water and an organic solvent such as alcohols or dimethylsulfoxide. The sulfonic fluoropolymer may be converted to its ionic form by reacting it with 25 weight % NaOH under the following conditions: (1.) immerse the sulfonic fluoropolymer in about 25 weight percent sodium hydroxide for about 16 hours at a temperature of about 90°Celsius: (2.) rinse the sulfonic fluoropoly in deionized water heated to about 90° C., using about 30 to about 60 minutes per rinse. The pendant group is then in the —SO3—Na+ form. Cations other than —Na+ can be made to replace the Na+ if practical (such as —H+).

The fluoropolymers of the present invention can be laminated with other fluoropolymers to form laminated composite films. For example, they can be laminated with fluoropolymer films containing sulfonic or carboxylic ion exchange active groups. Such other films and lamination techniques are well known in the art, and are illustrated in a variety of patents including U.S. Pat. Nos. 3,282,875; 3,909,378; 4,025,405; 4,065,366; 4,116,888; 4,123,336; 4,126,588; 4,151,052; 4,176,215; 4,178,218; 4,192,725; 4,209,635; 4,212,713; 4,251,333; 4,270,996; 4,340,680; 4,357,218; and European patent application No. 0,027,009.

The fluoropolymers of the present invention can be used alone, or as a laminated structure with other fluoropolymers in electrolytic cells, such as chloralkali cells. In such cells, the films are positioned between an anode and a cathode. They provide an ion permeable barrier between the electrodes.

EXAMPLE 1

This example shows the preparation of a sulfonic fluoropolymer having an equivalent weight of about 717 and a hydration product of about 13,982.

A 0.000473 cubic meter (one-pint) glass-lined reactor with titanium wetted parts kept under a gaseous pad of tetrafluoroethylene gas (TFE) is charged with about 250 milliliters of deionized, deoxygenated water, about 3 grams of ammonium perfluorooctanoate, about 1.5 grams of $Na_2HPO_4.7H_2O$, and about 1.0 gram of $Na_2HPO_4.7H_2O$. The reactor is equipped with an internal titanium cooling coils, a turbine agitator, a platinum resistance temperature device, a magnetically coupled stirring device, a titanium dip tube, a gaseous monomer feed inlet, and a liquid jacket which is temperature controlled. Additive feed cylinders are attached to overhead lines. Gaseous monomers are fed through an integrating mass flow indicator to indicate and control their flow.

After charging the above-described ingredients into the reactor, the jacket temperature controller which is a three-loop proportioning integrating derivative pressure controller, is set to control the temperature of the contents of the reactor at about 45° C. The upper, gasfilled portion of the one-pint reactor is evacuated to about 122,000 pascals [3 pounds per square inch gauge (psig)] and pressured to about 170,000 pascals (10 psig) with TFE, three times, leaving a vacuum the last time. After this, the agitator is started and set at about 800 revolutions per minute (rpm). The temperature of the reaction is allowed to stabilize at a temperature of about 45° C. Then about 50 grams of 2-fluorosulfonylperfluoroethyl vinyl ether is injected into the reactor. Thereafter, about 50 milliliters of deionized, deoxygenated water with about 0.1 gram of $(NH_4)_2S_2O_8$ (serving the purpose of an initiator or source of radicals) is injected using TFE pressure. Switching to bottom feed (i.e. injecting the TFE through an injection point at the bottom of the reactor rather than into the upper gaseous area), the TFE pressure is quickly raised to about 1,136,000 pascals (150 psig). The pressure is allowed to vary between about 984,000 pascals (128 psig) and about 1,163,000 pascals (154 psig) as the TFE feed rate is set at about 0.7% of a 500 standard cubic centimeters per minute (sccm) flow control valve. As the pressure reached about 984,000 pascals (128 psig), the TFE feed rate is raised to 42% of a 500 sccm flow control valve to bring the TFE pressure back to about 1,136,000 pascals (150 psig) over a period of about five minutes. After a total of about 4 hours, the reactor is vented and the contents are acidified to coagulate the latex produced during the reaction by adding about 50 milliliters of about 6 normal HCl. The mixture is stirred. The coagulated sulfonic fluoropolymer is filtered and washed repeatedly with two reactor volumes of water (about 600 milliliters, total) and then two reactor-volumes of anhydrous methanol (about 600 milliliters, total). The sulfonic fluoropolymer is vacuum dried overnight at about 26 inches Hg vacuum at about 110° C. The polymerization yielded about 19.1 grams sulfonic fluoropolymer at an equivalent weight of about 717 for a comonomer conversion of about 15%.

The equivalent weight of the dried sulfonic fluoropolymer powder is determined by using a basic digestion bath with a difference titration of residual base when an excess is added. The dried sulfonic fluoropolymer powder is used in this procedure. About two grams of sulfonic fluoropolymer is weighed into a 250 milliliter Teflon-coated erlenmeyer flask. A Teflon-covered stirring bar is added to the flask (Teflon is a trademark owned by E. I. Du Pont de Nemours and Company). Then about 20 milliliters of an about 1.0 weight % solution of cetyltrimethylammonium bromide is added. Thereafter, about 100 milliliters of approximately 0.1 normal NaOH solution and about 50 milliliters of dimethylsulfoxide is added to the flask. The flask is then placed on a stirring hot plate with a condenser attached to the top of the flask through a stopper. The flask is positioned in an oil bath and the temperature of the contents of the flask is controlled to a temperature of about 80° C. The flask is left with stirring at 80° C. for about 24 hours. The condenser is removed and rinsed with deionized water and the contents of the flask are allowed to cool to room temperature. The sulfonic fluoropolymer sample is then transferred to a beaker and the flask is rinsed thoroughly. The beaker contents are then titrated with approximately 0.1 normal HCl solution. The equivalent weight is then calculated using the following formula: Equivalent weight={(wt. of dry sample*2000)/[meq. of base−(volume of 0.1N HCl/10)]}

An about 3.02 gram sample of the sulfonic fluoropolymer is placed between two sheets of Teflon coated glass cloth and two chrome-plated brass photographic plates and then the sand which is put into the jaws of a hydraulic hot press at about 260° C. (about 500° F.) for two minutes with the jaws barely closed on the plates. After about two minutes, the jaws are closed, causing them to exert about 8896 newtons (about 1 ton) applied force to the plates for about two minutes. The sheets are removed and peeled apart. The sulfonic fluoropolymer is then in the form of a disk about 0.203 millimeters (about 8.0 mils) thick about about 118 millimeters in diameter. The sulfonic fluoropolymer film is hydrolyzed in about 25 weight % NaOH for about 16 hours at about 80° C. to convert the functional groups to the —$SO_3Na$ ionomer form. Then the film is placed in about 6 normal HCl for about 4–8 hours to convert it to the —$SO_3H$ form. After this, the film is boiled in deionized water, then placed in a vacuum oven overnight at about 26 inches Hg vacuum and about 110° C. The dried film is removed from the oven and quickly weighed. It is found to have a mass of about 3.082 grams. The film is boiled in deionized water for about 30 minutes, removed and wiped dry quickly. It is then weighed. This was repeated a total of three times. The films were determined to gain an average of about 48.7% water absorption. The films were calculated to have a hydration product of about 13,928 and have about 19.4 moles water per functional group. The hydration product is calculated according to the following formula:

[((wet weight−dry weight)/dry weight)*(Equivalent Weight/18)]*Equivalent Weight=Hydration Product The film is observed as having stiffness and elasticity in its hydrated form, which is qualitatively similar to polymers of the prior art in the region of 800 equivalent weight. The polymer exhibits viscous melt behavior (ease of pressing) characteristic of narrower molecular weight distributions.

EXAMPLE 2

This example illustrates the preparation of a sulfonic fluoropolymer having an equivalent weight of about 564 and a hydration product of about 114,229.

An about 0.076 cubic meter (about 20 gallons glass-lined reactor equipped with an anchor agitator, H-baffles, a platinum resistance temperature device and temperature control jacket, is charged with about 0.448 perfluorooctanoate, about 0.339 kilograms (0.747 pounds) of $Na_2HPO_4.7H_2O$, about 0.279 kilograms (0.616 pounds) of $Na_2HPO_4.7H_2O$ and about 0.179 kilograms (0.395 pounds) of $(NH_4)_2S_2O_8$. The reactor is padded with nitrogen and then evacuated to about 0.4 inches $H_2O$. The jacket temperature control is set to bring the reactor contents to about 60° C., and the agitator is set to about 250 rpm. Water feed into the reactor is started and fed to a total water charge of about 84,400 grams, with the final reactor pressure arriving at about 20,700 pascals [3.0 pounds per square inch absolute (psia)]. Heat is then applied on the jacket, and thus to the contents of the reactor. About 25.891 kilograms (57.08 pounds) of 2-fluorosulfonylperfluoroethyl vinyl ether is then charged into the reactor. TFE gas is added to bring the pressure of the reactor up to about 929,000 pascals (120 psig) in about 20 minutes and the pressure is held constant until a total of about 19.958 kilograms (44 pounds) of TFE gas had been fed into the reactor over a run time of about 2 hours and 56 minutes. TFE flow is then stopped and the pressure is bled down. A sample of the sulfonic fluoropolymer latex produced during the reaction is analyzed and found to contain about 24.66% solids and has a pH of about 2.45, at about 33° C.

A portion of the sulfonic fluoropolymer latex produced during the reaction is transferred to an about 0.038 cubic meter (10 gallon) vessel where residual monomer is withdrawn by settling and vacuum. About 30.390 kilograms (67 pounds) of the sulfonic fluoropolymer latex, after the residual monomer has been withdrawn, is treated with about 769 grams of $H_2SO_4$ (concentrated) with agitation at about 220 rpm. The temperature rises from about 5° C. to about 10° C. About 17,958 grams of coagulated sulfonic fluoropolymer latex is removed from the vessel, and about 7,696 grams of deionized water is added to the vessel with continued agitation. After about 15 minutes, the agitator is stopped and about 9,000 grams of water is drained. About 9,000 grams of water is added and the process is repeated, removing about 13,242 grams of water, adding a like amount, then removing about 1,000 grams of water, then 168 grams of water. Finally, about 37.5 grams of about 50 weight % NaOH is added to the vessel and the contents of the vessel and it is agitated for about 5 minutes and then stopped. Washes are performed, totaling approximately 136.077 kilograms (300 pounds) of water. Final conductivity of the wash water is found to be about 175 micro mhos. The water is then drained away from the sulfonic fluoropolymer and the sulfonic fluoropolymer is allowed to dry on standing.

The sample was titrated (as described in Example 1) to determine its equivalent weight. It was found to be about 564. An approximately 3.00 gram sample of this sulfonic fluoropolymer is placed in a hydraulic press between photographic plates and heated to about 260° C. (about 500° F.) for about 2 minutes at no applied pressure. After about two minutes, the jaws of the press are partially closed, exerting a pressure of about 4500 newtons (0.5 ton force) and, after an additional one minute, the plates are removed and the sulfonic fluoropolymer, between two thin sheets of Teflon coated glass cloth, is in the form of a disc about 0.254 millimeter (about 10 mils) thick and about 95 millimeters in diameter. The film is hydrolyzed in about 25 weight % NaOH for about 16 hours at about 80° C. and then converted to the —$SO_3H$ form by immersion for about 8 hours in about 6 normal HCl. The film is then washed in deionized water, boiled in deionized water, and then vacuum dried overnight at about 27 inches Hg vacuum at about 105° C. The film is found to have a mass of about 2.753 grams. The film is then placed in deionized water and boiled for about 30 minutes, removed, wiped dry and weighed as quickly as possible. The hydrated sulfonic fluoropolymer has a weight of about 20.54 grams. Using the weight gain, it has, thus, had a water absorption of 646%. This represents a hydration of about 202 moles $H_2O$ per functional group. The hydration product for this sulfonic fluoropolymer is calculated to be about 114,229.

This film still maintains its form despite being grossly extended. The film could be handled and unfolded from its wrinkled state.

EXAMPLE 3

This example shows the preparation of a sulfonic fluoropolymer having an equivalent weight of about 766 and a hydration product of about 24,064.

A 0.076 cubic meter (20 gallon) glass-lined reactor equipped with an anchor agitator, H-baffle, a platinum resistance temperature device, and a temperature control jacket is charged with about 527 grams of ammonium perfluorooctanoate, about 398.4 grams of $Na_2HPO_4.7H_2O$, about 328.8 grams $Na_2HPO_4.7H_2O$, and about 210.8 grams of $(NH_4)_2S_2O_8$. The reactor is then evacuated down to about 0.0 psia on the electronic pressure readout and then an inert gas (nitrogen) is added to pressure up the reactor to a pressure of about 448,000 pascals (about 65 psia). This is done a total of four times, then the reactor is evacuated one more time. About 99,0155 grams of deoxygenated, deionized water is added, the agitator is started and heat is applied to the jacket. The agitator is set to about 250 rpm and then about 16.646 kilograms (about 36.7 pounds) of 2-fluorosulfonyl perfluoroethyl vinyl ether is added. With the temperature at about 60° C., TFE gas is fed to the reactor at a rate of from about 0.499 to about 0.567 kilograms per minute (1.1 to about 1.25 pounds/min.) until a pressure of about 1,475,000 pascals (217 psia) is reached over a period of about seventeen minutes. The feed continued for about another 10 minutes at which time feed is stopped and nitrogen is blown through the gas phase portion of the system and ambient temperature water is added to the jacket surrounding the reactor. A total of about 13.499 kilograms (29.76 pounds) of TFE gas had been added to the reactor. The latex produced during the reaction is found to contain about 16.9% solids. The latex is transferred to a larger vessel for separation and stripping of residual monomer. A portion, about 14.515 kilograms (32 pounds), of the latex is added to a 0.038 cubic meter (10 gallon) vessel with agitation to about 110 rpm. Then about 0.919 kilograms (2.025 pounds) of concentrated $H_2SO_4$ is added over a period of about 3–4 minutes. The contents temperature rose from about 14° C. to about 18° C. The contents is then neutralized by adding about 1.0 normal NaOH. The coagulated sulfonic fluoropolymer is filtered away from the neutralized solution, centrifuged and washed repeatedly with water in the centrifuge. The wet cake weighed about 2054.2 grams. The cake is dried overnight in a rotary cone dryer at about 110° C. under about 26 inches Hg vacuum and about 1709.2 grams is recovered.

The equivalent weight of the sulfonic fluoropolymer is determined according to the method described in Example 1 and was found to be about 766.

About three grams of the sulfonic fluoropolymer is pressed into a film at about 260° C. (500° F.) and about 8896 newtons (1 ton) force on a hydraulic hot press between sheets of Teflon covered glass cloth and brass photographic plates for about two minutes after preheat to the 260° temperature for about two minutes at zero pressure. The film is hydrolyzed to the $Na^+$ ionic form by placing it in about a 25 weight % NaOH solution at about 80° C. for about 16 hours. The film is then placed in about a 6 normal HCl bath for about eight hours for conversion of the groups to the $H+$ form. The film is then boiled for about thirty minutes in deionized water and placed in a vacuum oven at about 110° C. and about 26 inches Hg vacuum overnight. The film is then quickly removed from the oven and weighed and found to weigh about 2.865 grams. The film is then placed in a beaker of deionized water and boiled for about thirty minutes, removed and wiped dry and weighed as quickly as possible. The film is found to weigh about 4.9800 grams in its hydrated state. This is about 73.8% water absorption and the hydration product is therefore about 24064.

The film is tough and fairly elastic and the quality of pressing into a film easily (under the conditions described above) indicates the polymer has a favorable molecular weight distribution.

EXAMPLE 4

This example illustrates the preparation of a sulfonic fluoropolymer having an equivalent weight of about 699 and a hydration product of about 21,886.

A 0.011 cubic meter (3 gallon) glass lined reactor equipped with an anchor agitator, a paddle baffle, a platinum resistance temperature device and a temperature control jacket is charged with about 25 grams ammonium perfluorooctanoate, about 18.9 grams $Na_2HPO_4.7H_2O$, about 15.6 grams, and $Na_2HPO_4.7H_2O$ about 3.0 grams of $(NH_4)_2S_2O_8$. The reactor is then evacuated down to about 0.0 psia on the electronic pressure readout and then inert gas (nitrogen) is added to pressure up the reactor to about 448,000 pascals (65 psia). This is done a total of four times, then evacuated one more time. About 4,702 grams of deoxygenated, deionized water is added, the agitator is started and heat is applied to the jacket. The agitator is set to about 500 rpm and then about 778 grams of 2-fluorosulfonyl perfluoroethyl vinyl ether is added. With the temperature at about 60° C., TFE gas is fed to the reactor until a pressure of about 1,791,000 pascals (245 psig) is reached over a period of about five minutes. The reaction continued for about four hours and 38 minutes. The feed is stopped and nitrogen is blown through the gas phase portion of the reactor and ambient-temperature water is added to the jacket. A total of about 870 grams of TFE gas has been added to the reactor. The latex produced during the reaction is found to contain about 23.8% solids. The latex is weighed and found to be weigh about 6386.4 grams after stripping of residual monomer. The latex is coagulated with about 6 normal acid, filtered and washed repeatedly with water, then vacuum dried at about 110° C. The resulting sulfonic fluoropolymer powder is hydrolyzed and titrated (as described in Example 1) to determine the equivalent weight. The equivalent weight is found to be about 699. About three grams of the sulfonic fluoropolymer is pressed into a film at about 260° C. (500° F.) and about 8896 newtons (1 ton) on a hydraulic hot press between sheets of Teflon-covered glass cloth and brass photographic plates for about two minutes, after preheat to the 260° preheat temperature at about 101,000 pascals (zero psig). The film is then hydrolyzed to the Na+ ionic form by placing it in about a 25 weight % NaOH solution at about 80° C. for about 16 hours. The film is then placed in about a 6 normal HCl bath for about eight hours for conversion of the groups to the H+ form. The film is then boiled for about thirty minutes in deionized water and placed in a vacuum oven at about 110° C. and about 26 inches Hg vacuum overnight. The film is then quickly removed from the oven and weighed and found to weigh about 2.5245 grams. The film is then placed in a beaker of deionized water and boiled for about thirty minutes, removed and wiped dry and weighed as quickly as possible. The film is found to weigh about 4.5600 grams in its hydrated state. This is about 80.6% water absorption and the hydration product is therefore about 21886.

The film is surprisingly tough and flexible even when totally dry. The hydrated film is not fragile, as other films of the prior art. The elasticity without softness is unusual for the low equivalent weight polymer.

EXAMPLE 5

This example illustrates the preparation of a sulfonic fluoropolymer having an equivalent weight of about 650 and a hydration product of about 22,256.

A 0.011 cubic meter (3 gallon) glass-lined reactor, equipped with an anchor agitator, a paddle baffle, a platinum resistance temperature device, and a temperature control jacket, is charged with about 25 grams ammonium perfluorooctanoate, about 18.9 grams $Na_2HPO_4.7H_2O$, about 15.6 grams $Na_2HPO_4.7H_2O$, and about 10.0 grams of $(NH_4)_2S_2O_8$. The reactor is then evacuated down to about 0.0 psia on the electronic pressure readout and then inert gas (nitrogen) is added to pressure up the reactor to about 448,000 pascals (65 psia). This is done a total of four times, then evacuated one more time. About 4,702 grams of deoxygenated, deionized water is added, the agitator is started, and heat is applied to the jacket. The contents are heated to a temperature of about 60° C., while being stirred with the agitator set to about 500 rpm. Then about 787 grams of 2-fluorosulfonyl perfluoroethyl vinyl ether is added to the reactor. With the temperature at about 60° C., TFE gas is fed into the reactor over a period of about five minutes to reach a pressure of about 1,425,000 pascals (192 psig) and that pressure is held for the reaction period of about forty-one minutes. The TFE feed is stopped and nitrogen is blown through the gas phase portion of the reactor and ambient-temperature water is added to the jacket. A total of about 898 grams of TFE gas has been added to the reactor. The latex produced during the reaction is found to contain about 18.6% solids. The latex is weighed and found to be about 6169.2 grams after stripping of residual monomer. The latex is coagulated with about 6 normal acid, filtered, and washed repeatedly with water, then vacuum dried at about 110° C. sulfonic fluoropolymer powder is hydrolyzed and titrated (as described in Example 1) to determine the equivalent weight of the sulfonic fluoropolymer. The equivalent weight is found to be about 650. About three grams of the sulfonic fluoropolymer is pressed into a film at about 260° C. (500° F.) and about 8896 newtons (1 ton) on a hydraulic hot press between sheets of Teflon-covered glass cloth and brass photographic plates for about two minutes after being preheated to a temperature of about 260° C. at about 101,000 pascals (zero psig) pressure. The film is hydrolyzed to the Na+ ionic form by placing it in about a 25 weight % NaOH solution a about 80° C. for about 16 hours.

The film is then placed in about a 6 normal HCl bath for about eight hours for conversion of the groups to the H+ form. The film is then boiled for about thirty minutes in deionized water and placed in a vacuum oven at about 110° C. and about 26 inches Hg vacuum overnight. The film is then quickly removed from the oven and weighed and found to weigh about 2.9164 grams. The film is then placed in a beaker of deionized water and boiled for about thirty minutes, removed and wiped dry, and weighed as quickly as possible. The film is found to weigh about 5.6817 grams in its hydrated state. This is about 94.8% water absorption and the hydration product is therefore about 22256.

The polymer of this low equivalent weight pressed easily into a film that is tough and elastic at the 1 ton force level at 500° F. Other art does not record films of this type. Upon hydrolysis and acidification, the film remained tough and flexible, even after hydration.

EXAMPLE 6

This example illustrates the preparation of a sulfonic fluoropolymer having an equivalent weight of about 675 and a hydration product of about 26,126.

A 0.011 cubic meter (3 gallon) glass-lined reactor equipped with an anchor agitator, paddle baffle, a platinum resistance temperature device, and a temperature control jacket is charged with about 25 grams ammonium perfluorooctanoate, about 18.9 grams $Na_2HPO_4 \cdot 7H_2O$, about 15.6 grams $Na_2HPO_4 \cdot 7H_2O$, and about 10.0 grams of $(NH_4)_2S_2O_8$. The reactor is then evacuated down to about 0.0 psia on the electronic pressure readout and then inert gas (nitrogen) is added to pressure up the reactor to about 448,000 pascals (65 psia). This is done a total of four times, then evacuated one more time. About 4,702 grams of deoxygenated, deionized water is added, the agitator is started and heat is applied to the jacket. The agitator is set to about 500 rpm and then about 789 grams of 2-fluorosulfonyl perfluoroethyl vinyl ether is added. With the temperature at about 60° C., TFE gas is fed to the reactor over a period of about five minutes to reach a pressure of about 1,398,000 pascals (188 psig) and that pressure is held for the reaction period of about sixty nine minutes. The feed is stopped and nitrogen is blown through the gas phase portion of the system and ambient-temperature water is added to the jacket. A total of about 898 grams of TFE gas has been added to the reactor. The latex produced during the reaction is found to contain about 18.4% solids. The latex is weighed and found to be about 6145.6 grams after stripping of residual monomer. The latex is coagulated with about 6 normal acid, filtered and washed repeatedly with water, then vacuum dried at about 110° C. The sulfonic fluoropolymer powder produced thereby is hydrolyzed and titrated (as described in Example 1) to determine its equivalent weight. The equivalent weight is found to be about 675. About three and two-tenths grams of the sulfonic fluoropolymer is pressed into a film at about 260° C. (500° F.) and about 8896 newtons (1 ton) is applied on a hydraulic hot press between sheets of Teflon-covered glass cloth and brass photographic plates for two minutes after preheat preheated to a temperature of about 260° C., for about two minutes and pressed at 101,000 pascals (zero psig) pressure. The film is hydrolyzed to the Na+ ionic form by placing it in about a 25 weight % NaOH solution at about 80° C. for about 16 hours. The film is then placed in about a 6 normal HCl bath for about eight hours for conversion of the groups to the H+ form. The film is then boiled for about thirty minutes in deionized water and placed in a vacuum oven at about 110° C. and about 26 inches Hg vacuum overnight. The film is then quickly removed from the oven and weighed and found to weigh about 3.1370 grams. The film is then placed in a beaker of deionized water and boiled for about thirty minutes, removed and wiped dry and weighed as quickly as possible. The film is found to weigh about 6.3749 grams in its hydrated state. This is about 103.2% water absorption and the hydration product is therefore about 26126.

The film is somewhat softer than the films at lower hydration products; i.e., it is less elastic in its response, and is a viable film with somewhat lower stiffness.

We claim:

1. A sulfonic fluoropolymer having a fluoropolymer backbone having pendant groups attached thereto and represented by the general formula:

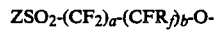
$ZSO_2\text{-}(CF_2)_a\text{-}(CFR_f)_b\text{-}O\text{-}$ where: Z is a halogen, an alkali metal, hydrogen, or OR; R is a branched or linear alkyl radical having from 1 to about 10 carbon atoms or an aryl radical; a is 0–2; b is 0–2; provided a+b is not equal to 0; $R_f$ is selected from the group consisting of -F, —Cl, perfluoroalkyl radicals having from 1 to about 10 carbon atoms and fluorochloroalkyl radicals having from 1 to about 10 carbon atoms, wherein the sulfonic fluoropolymer has an equivalent weight of less than about 700, and a hydration product of less than about 22,000, when Z is hydrogen.

2. An electrolytic cell having an anode and a cathode separated by the fluoropolymer film of claim 1.

3. A sulfonic fluoropolymer having a fluoropolymer backbone having pendant groups attached thereto and represented by the general formula:

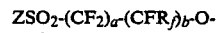
$ZSO_2\text{-}(CF_2)_a\text{-}(CFR_f)_b\text{-}O\text{-}$ where: Z is a halogen, an alkali metal, hydrogen, or OR; R is a branched or linear alkyl radical having from 1 to about 10 carbon atoms or an aryl radical; a is 0–2; b is 0–2; provided a+b is not equal to 0; $R_f$ is selected from the group consisting of -F, —Cl, perfluoroalkyl radicals having from 1 to about 10 carbon atoms and fluorochloroalkyl radicals having from 1 to about 10 carbon atoms, wherein the sulfonic fluoropolymer has an equivalent weight of less than about 675, and a hydration product of less than about 22,000 when Z is hydrogen.

4. A sulfonic fluoropolymer having a fluoropolymer backbone having pendant groups attached thereto and represented by the general formula:

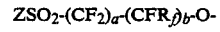
$ZSO_2\text{-}(CF_2)_a\text{-}(CFR_f)_b\text{-}O\text{-}$ where: Z is a halogen, an alkali metal, hydrogen, or OR; R is a branched or linear alkyl radical having from 1 to about 10 carbon atoms or an aryl radical; a is 0–2; b is 0–2; provided a+b is not equal to 0; $R_f$ is selected from the group consisting of -F, —Cl, perfluoroalkyl radicals having from 1 to about 10 carbon atoms and fluorochloroalkyl radicals having from 1 to about 10 carbon atoms, wherein the sulfonic fluoropolymer has an equivalent weight of less than about 650, and a hydration product of less than about 22,000, when Z is hydrogen.

5. A sulfonic fluoropolymer having a fluoropolymer backbone and having pendant groups attached thereto represented by the general formula:

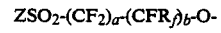
$ZSO_2\text{-}(CF_2)_a\text{-}(CFR_f)_b\text{-}O\text{-}$ where Z is a halogen, an alkali metal, hydrogen, or OR; R is a branched or linear alkyl radical having from 1 to about 10 carbon atoms or an aryl radical; a is 0–2; b is 0–2; provided a+b is equal to 1 or 2; $R_f$ is selected from the group consisting of —F,—Cl, perfluoroalkyl radicals having from 1 to about 10 carbon atoms and fluorochloroalkyl radicals having from 1 to about 10 carbon atoms, wherein the sulfonic fluoropolymer has an equivalent weight less than about 725.

6. A sulfonic fluoropolymer having a fluoropolymer backbone and having pendant groups attached thereto represented by the general formula:

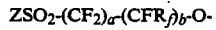

where Z is a halogen, an alkali metal, hydrogen, or OR; R is a branched or linear alkyl radical having from 1 to about 10 carbon atoms or an aryl radical; a is 0–2; b is 0–2; provided a+b is equal to 1 or 2; $R_f$ is selected from the group consisting of —F,—Cl, perfluoroalkyl radicals having from 1 to about 10 carbon atoms and fluorochloroalkyl radicals having from 1 to about 10 carbon atoms, wherein the sulfonic fluoropolymer has an equivalent weight less than about 700.

7. A sulfonic fluoropolymer having a fluoropolymer backbone and having pendant groups attached thereto represented by the general formula:

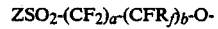

where Z is a halogen, an alkali metal, hydrogen, or OR; R is a branched or linear alkyl radical having from 1 to about 10 carbon atoms or an aryl radical; a is 0–2; b is 0–2; provided a+b is equal to 1 or 2; $R_f$ is selected from the group consisting of —F,—Cl, perfluoroalkyl radicals having from 1 to about 10 carbon atoms and fluorochloroalkyl radicals having from 1 to about 10 carbon atoms, wherein the sulfonic fluoropolymer has an equivalent weight less than about 675.

8. A sulfonic fluoropolymer having a fluoropolymer backbone and having pendant groups attached thereto represented by the general formula:

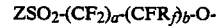

where Z is a halogen, an alkali metal, hydrogen, or OR; R is a branched or linear alkyl radical having from 1 to about 10 carbon atoms or an aryl radical; a is 0–2; b is 0–2; provided a+b is equal to 1 or 2; $R_f$ is selected from the group consisting of —F,—Cl, perfluoroalkyl radicals having from 1 to about 10 carbon atoms and fluorochloroalkyl radicals having from 1 to about 10 carbon atoms, wherein the sulfonic fluoropolymer has an equivalent weight less than about 650.

9. A sulfonic fluoropolymer having a fluoropolymer backbone and having pendant groups attached thereto represented by the general formula:

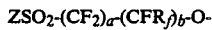

where Z is a halogen, an alkali metal, hydrogen, or OR; R is a branched or linear alkyl radical having from 1 to about 10 carbon atoms or an aryl radical; a is 0–2; b is 0–2; provided a+b is equal to 1 or 2; $R_f$ is selected from the group consisting of —F,—Cl, perfluoroalkyl radicals having from 1 to about 10 carbon atoms and fluorochloroalkyl radicals having from 1 to about 10 carbon atoms, wherein the sulfonic fluoropolymer has an equivalent weight less than about 600.

10. A sulfonic fluoropolymer having a fluoropolymer backbone and having pendant groups attached thereto represented by the general formula:

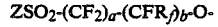

where Z is a halogen, an alkali metal, hydrogen, or OR; R is a branched or linear alkyl radical having from 1 to about 10 carbon atoms or an aryl radical; a is 0–2; b is 0–2; provided a+b is equal to 1 or 2; $R_f$ is selected from the group consisting of —F,—Cl, perfluoroalkyl radicals having from 1 to about 10 carbon atoms and fluorochloroalkyl radicals having from 1 to about 10 carbon atoms, wherein the sulfonic fluoropolymer has an equivalent weight less than about 575.

11. A laminated composite film comprising a fluoropolymer film having sulfonic or carboxylic ion exchange active groups in one layer and, as the other layer, a sulfonic fluoropolymer having a fluoropolymer backbone having pendant groups attached thereto and represented by the general formula:

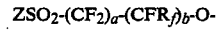

where: Z is a halogen, an alkali metal, hydrogen, or OR; R is a branched or linear alkyl radical having from 1 to about 10 carbon atoms or an aryl radical; a is 0–2; b is 0–2; provided a+b is not equal to 0; Rf is selected from the group consisting of —F,—Cl, perfluoroalkyl radicals having from 1 to about 10 carbon atoms and fluorochloroalkyl radicals having from 1 to about 10 carbon atoms, wherein the sulfonic fluoropolymer has an equivalent weight of less than about 700, and a hydration product of less than about 22,000, when Z is hydrogen.

* * * * *